United States Patent Office 3,354,219
Patented Nov. 21, 1967

3,354,219
METHOD FOR PREPARATION OF ISOHUMULONE CONCENTRATES
Francis L. Rigby, Toronto, Ontario, Canada, assignor, by mesne assignments, to John I. Haas, Inc., Washington, D.C., a corporation of Delaware
No Drawing. Filed Apr. 20, 1964, Ser. No. 361,232
1 Claim. (Cl. 260—586)

This invention relates to the making of a hop concentrate and to the hopping of a malt beverage.

Hops are used in the brewing of beer and like beverages to impart a desired bitter characteristic and from this standpoint the most useful components of hops are a group of chemically similar substances called alpha acids or humulones. In the conventional brewing process hops are boiled in wort to convert or isomerize the humulones to isohumulones in which form they are the principal hop bittering substances in beer.

The conventional method of boiling hops in wort to convert the humulones to isohumulones is a very inefficient use of hops. The wort, when boiled, yields a protein precipitate that must be removed. Isohumulones and unconverted humulones tend to cling to this precipitate and are removed to waste with the precipitate with the result that up to 75% of the hop bittering value is lost. Additionally the handling of large quantities of bulky hops is cumbersome and costly.

It is an object of this invention to overcome these inefficiencies in the hopping of wort and to provide a method for making an effective isohumulone concentrate that will eliminate the necessity of boiling hops in wort and reduce the problem of handling large quantities of raw hops. Additionally use of the concentrate provides a higher degree of flavour control.

Previous attempts have been made at making an isohumulone concentrate, but to my knowledge they have all proved ineffective in practice and not adapted to commercial development. For example, United States Patent 978,476 dated Dec. 13, 1910 to A. Nilson discloses a method for hopping wort in which the hops are heated in an ammonia solution to about 100° F. to obtain a precipitate of alpha acids and other resinous materials. The precipitate is collected and added to and boiled with the wort where the alpha acids are isomerized. The method does not avoid the waste of bittering substances noted above caused by their adherance to the protein precipitate in the wort which must be removed. The method does not contemplate isomerization by boiling prior to addition to the wort which is one essential feature of this invention.

British Patent 855,401 dated Nov. 30, 1960, to Brewing Patents Ltd. is a further disclosure of the prior art which falls short of the objectives of this invention but which is typical of the prior art. This patent discloses a method of making converted hop extract and thereby avoids the objectionable loss of bittering substance due to removal of the precipitate formed on the protein break in the wort, but the described method for making the extract gives a very poor yield of isohumulone from hops. The disclosed method essentially consists of boiling the hops in an aqueous alkali solution, acidifying the alkaline isomerization reaction mixture and treating the entire reaction mixture with light petroleum or ether which is subsequently removed by distillation in an attempt to extract the isohumulones. The residue thus obtained is the base of a bittering concentrate. Light petroleum will not efficiently extract the isohumulones from the precipitate that is inevitably formed in the reaction mixture in this way with the result that the yield of bittering substances from the hops is very poor.

This invention achieves the stated objects and overcomes the failings of the above two noted prior and other disclosures.

Generally speaking an isohumulone concentrate is prepared in the practice of this invention by boiling hops in a weak alkaline solution to extract humulones from the hops and isomerize them, separating the hops from the solution, forming an isohumulone adsorbing precipitate in the solution by acidifying it. It has been discovered that up to 95% of the isohumulones adhere to a flocculent precipitate that forms in the reaction mixture and according to this invention one separates the precipitate from the solution whereby to yield an isohumulone rich product.

The isohumulone rich product, or a concentrate consisting essentially of the isohumulones of the precipitate, can be added to beer or wort or a concentrate consisting essentially of the isohumulones of the precipitate. The addition in the case of wort is of course after clarification following the protein break because as indicated above isohumulones are removed and lost in the protein break. The problem does not arise if the addition is to the beer or fermented wort. Since some loss occurs in the fermentation, it is preferred to add isohumulones to the beer.

The process of this invention also has the advantage that it is suited to the collection by distillation of the aromatic oils that are boiled off. These oils can be selectively reintroduced into the concentrate for addition to the beer or wort as desired.

The invention will be clearly understood after reference to the following detailed specification.

The following is an example of the preparation of a concentrate of isohumulones according to this invention. An aqueous alkaline extractant solution for humulones comprising 3000 ml. of hot water and 90 ml. of 3.0 N NaOH was added to 80 g. of hops (containing 5.6 g. of alpha acids) in a closed vessel that was vented to atmosphere through a condenser and boiled for about 10 minutes. In this case the pH of the extractant solution was between 10 and 11.

During the boiling process, essential oils from the hops distilled with steam passed out of the vessel to the condenser and were collected separately in a layer over the aqueous condensate from which they were collected for subsequent use as an addition to beer or the like.

The isomerization of the alpha acids of the hops was substantially completed in about 10 minutes boiling. The quantity of NaOH added was as indicated sufficient to render the final hop suspension alkaline within the range pH 10 to pH 11. In this latter connection, if more sodium hydroxide had been added, a shorter boiling time would have been required for isomerization, but more extraneous and undesirable materials, such as, proteins, carbohydrates, hydrolized cellulose, etc., would have been extracted and these tend to contaminate some of the desirable isohumulones. The requirement is that the boiled solution be a weak alkaline solution and the alkalinity can be adjusted within practical limits based on the above consideration.

After the boiling period the liquor was separated from the spent hops by filtration, and sufficient 6 N HCl (approximately 74 ml.) was added to the alkaline extractant solution to adjust the acidity to approximately pH 1 whereupon a flocculent precipitate formed. The acid is added for the purpose of forming the precipitate and generally speaking, it is desired to get a large amount of precipitate because, as will be explained, the isohuuulones adhere to the precipitate. The amount of precipitate depends upon the amount of acid added up to full precipitation. With an acidity of about pH 1, the formation of the precipitate was substantially complete. There is, therefore, no point in adding more than the above noted quantities of HCl.

The precipitate readily settled to the bottom of the liquid and some of the supernatant liquor was run off and discarded. The precipitate with the remaining liquor was centrifuged to yield 100 g. of centrifuged wet solids in the form of a sludge-like isohumulone-rich product.

The flocculent precipitate that is formed on the acidification of the alkaline extract is a complex mixture of proteins, tannins and resins which are soluble in the aqueous alkaline solution, but which are precipitated when the solution is made acid. It has been found that once precipitated, it is a very strong absorbent for the isohumulones and effectively removes them from solution. The precipitate is separated from the supernatant liquor as a means of removing the iso-compounds with it and constitutes an efficient means for introducing isohumulones to beer or wort.

The centrifuged precipitate noted above contained approximately 89% water, and as indicated was a sludge-like humulone rich product.

As an alternative to the centrifuge separation of the precipitate from the liquor, filtration separation was used to yield 26 g. of sludge-like wet solids. This product had approximately 58% water.

The wet precipitate of both methods of separation contained 3.6 g. of isohumulones by analysis representing 64% of the alpha acid content of the original hops.

The sudge-like isohumulone-rich precipitate produced as indicated above can be vacuum dried to yield a dry powder. In this connection, the sludge-like precipitate of the foregoing example was vacuum dried at about 35° C. and a pressure of approximately 200 mm. Hg to yield 10.7 g. of a dry powder which contained 3.3 g. of isohumulones representing 59% of the alpha acid content of the original hops.

The dry powder described above can be further refined by extracting the isohumulones therefrom with a solvent, separating the insoluble non isohumulone material by filtration and evaporating the solvent solution to yield an isohumulone rich, viscous, oily substance. For example, the dry powder described above was extracted with a light petroleum (B.P. 30° C. to 60° C.), separated from the solids precipitate and all of the solvent was evaporated to yield a 6.4 g. of a light-coloured oily substance containing 3.3 g. of isohumulones again equivalent to 59% of the alpha acids of the original hops.

Alternatively, the isohumulones could be extracted from the dry powder described above with a non hydrocarbon solvent such as diethyl ether, dichlorethylene or chloroform, separated and evaporated to yield a small amount of a light-coloured oily substance containing the same amount of iso-humulones but with, in this case, larger amount of extraneous materials because these solvents tend to dissolve more of the contaminants from the powder than petroleum.

The isohumulones can be separated from the sludge-like isohumulone-rich product described above by a two phase liquid to liquid extraction. In this case, the wet sludge-like precipitate described above was dissolved in about 150 ml. of methyl alcohol. An equal volume of 2% aqueous sulphuric acid was added to suppress the ionization or dissociation of the isohumulones and, by mixing with the methyl alcohol, to form a liquid phase that is immiscible with the light petroleum to be added. Following the addition of light petroleum, the mixture was agitated. The isohumulones became dissolved in the light petroleum, but the precipitate preferred the aqueous acid methyl alcohol phase. The two liquids were permitted to settle, separated and the light petroleum was evaporated to yield an isohumulones concentrate. The isohumulone yield was about 3.63 g. representing 65% of the original alpha acid content of the hops.

Other two phase systems will be apparent to those skilled in the art. Ethyl alcohol or acetone could be used as the water miscible solvent and ethyl ether or dichlorethylene as the water miscible solvent. In each case evaporation of the solvent is required to obtain the final product.

In all instances where a solvent is used the objective is to select a solvent that is at least partially selective to the isohumulone content of the isohumulone-bearing precipitate complex which can be separated from the whole and then evaporated to leave a product that is richer in isohumulone content than the original precipitate complex.

As an example of the variation in boiling time with variation in alkalinity of the original solution, consider the following example. An extractant solution comprising 3000 ml. of hot water containing 39.7 ml. of 1.5 N NaOH were added to 80 g. of hops in a suitable vessel and the mixture boiled for two hours. The NaOH in this case was sufficient only to bring the final liquor to pH 8. The boiling time required to effect complete isomerization of the alpha acids in this case was very much longer as a result of the decrease of alkalinity of the extracting solution.

Following the completion of the boiling, the procedure was as indicated above to yield 47.7 g. of wet centrifuged solids containing 2.4 g. of isohumulones.

If the alkalinity of the hop and water solution is adjusted to about pH 9 prior to boiling, about 1 hour of boiling time is required to complete the isomerization.

The isomerization reaction is catalized by hydroxyl ion and the boiling time required is reduced as the hydroxyl ion concentration is increased. It will be apparent, therefore, that the extraction is not restricted to a specific alkalinity, the end product being essentially the same in the examples given. However, below pH 8 the time required for isomerization becomes impractical in many cases.

In the examples given, the alkali and acid used were NaOH and HCl respectively. Obvious commercial alternatives are possible. For example, $Na_2CO_3$, $NH_4OH$ and KOH and commercial soda ash may be used in the isohumulone extraction while $H_2SO_4$ is equally as satisfactory as HCl for acidification. The requirement is that it should not contaminate the end product as a potable beverage additive.

In use, either the sludge-like isohumulone-rich product filtered or centrifuged from the extractant or the isohumulones that are removed therefrom are added directly to the beer to achieve bittering value. It is preferable in most cases to add the product to the beer after the fermentation stage because a certain amount of isohumulone loss is encountered in the fermentation stage. In some cases, however, it may be preferred to add the extract to the wort after clarification following the protein break. The place of addition is a matter for the brew master to decide. This invention is concerned essentially with the manufacture of the concentrate.

As described above the simultaneous collection of the essential oil fraction, by steam distillation, can be carried out while extracting and isomerizing the alpha acids of the hops. In this way two products i.e. isohumulones and essential oils can be obtained from one batch of hops. While the oil which distills from the alkaline mixture in which the hops are isomerized is somewhat different in character to the oil that distills from neutral or slightly acidic medium from which it is distilled, according to standard practice it has been found that the oil which distills from the alkaline medium is as useful as an additive for beer. It has a somewhat milder odour and flavour but its utility is none the less diminished because these things are often a matter of preference.

Thus with this invention one can recover essential oils from hops while simultaneously isomerizing the alpha acids to form isohumulones. The essential oils are added to beer or wort in use according to standard practice.

Embodiment of the invention other than the one illustrated will be apparent to those skilled in the art. The essential feature of this invention is the concept of separating the isohumulone bearing precipitate from the extractant as described above either for direct addition to a beverage or for further dehydrating and/or separating of the isohumulones from the precipitate and then adding to a beverage. The concept behind the invention is the realization that the isohumulones adhere to the precipitate in the extractant solution and can be most efficiently removed by mechanically separating the isohumulone-rich precipitate from the extractant solution. Embodiment of the invention other than the ones set forth in this specification will be apparent to those skilled in the art, and it is not intended that the foregoing specification should be read in a limiting sense.

What I claim as my invention is:

A method of preparing a concentrate of isohumulones comprising the steps of extracting and isomerizing humulones from hops by boiling them in a weak aqueous alkaline extractant solution for the humulones, removing hops from said extractant solution, acidifying said extractant to a pH of about 1 to form an isohumulone adsorbing precipitate, and mechanically separating said precipitate from said extractant to yield a sludge-like isohumulone rich product.

References Cited

FOREIGN PATENTS 855,401  11/1960  Great Britain.

OTHER REFERENCES

Hoggan, "Food Manufacturer," pp. 67 to 70, February 1961.

Rudin et al. "Jour. Inst. Brewing," vol. 66, pp. 18 to 22 (1960).

LEON ZITVER, *Primary Examiner.*

M. JACOB, *Assistant Examiner.*